United States Patent
Friou

(10) Patent No.: US 7,416,050 B2
(45) Date of Patent: Aug. 26, 2008

(54) GAS EXPANSION SILENCER

(75) Inventor: Claude Friou, Conde sur Vesgre (FR)

(73) Assignee: Bertin Technologies (FR)

( * ) Notice: Subject to any disclaimer, the term of this patent is extended or adjusted under 35 U.S.C. 154(b) by 153 days.

(21) Appl. No.: 10/841,088

(22) Filed: May 7, 2004

(65) Prior Publication Data

US 2004/0256174 A1    Dec. 23, 2004

Related U.S. Application Data

(63) Continuation of application No. PCT/FR02/03686, filed on Oct. 25, 2002.

(30) Foreign Application Priority Data

Nov. 9, 2001    (FR)    ................................ 01 14683

(51) Int. Cl.
    *F01N 1/04*    (2006.01)
(52) U.S. Cl. .................. 181/252; 181/232; 181/256; 181/272
(58) Field of Classification Search .............. 181/272, 181/230, 232, 252, 256
    See application file for complete search history.

(56) References Cited

U.S. PATENT DOCUMENTS

| | | | |
|---|---|---|---|
| 2,990,907 A * | 7/1961 | Everett | 181/256 |
| 3,400,784 A * | 9/1968 | Thrasher | 181/267 |
| 3,561,561 A * | 2/1971 | Trainor | 181/267 |
| 3,635,309 A * | 1/1972 | Nemcansky et al. | 181/267 |
| 3,957,133 A * | 5/1976 | Johnson | 181/256 |
| 4,241,805 A * | 12/1980 | Chance, Jr. | 181/232 |
| 4,324,314 A * | 4/1982 | Beach et al. | 181/230 |
| 4,877,084 A * | 10/1989 | Goggin | 166/75.11 |
| 4,932,495 A * | 6/1990 | Chapman | 181/242 |
| 5,166,479 A * | 11/1992 | Gras et al. | 181/256 |
| 5,266,755 A * | 11/1993 | Chien | 181/252 |
| 6,089,346 A * | 7/2000 | Tredinnick et al. | 181/230 |

FOREIGN PATENT DOCUMENTS

| | | | |
|---|---|---|---|
| EP | 0 404 801 A | | 1/1991 |
| FR | 2 055 030 A | | 5/1971 |
| GB | 2056563 A | * | 3/1981 |
| WO | WO 9917007 A1 | * | 4/1999 |

* cited by examiner

*Primary Examiner*—Lincoln Donovan
*Assistant Examiner*—Jeremy Luks
(74) *Attorney, Agent, or Firm*—Alston & Bird LLP

(57) ABSTRACT

A gas expansion silencer comprising an endpiece for being connected to a source of gas under pressure, and a low-pressure stage comprising two cylindrical portions respectively of smaller diameter and of larger diameter, the smaller-diameter portion being connected to the endpiece and the larger-diameter portion having gas outlet orifices, the low-pressure stage being entirely filled with a porous metal packing.

8 Claims, 1 Drawing Sheet

GAS EXPANSION SILENCER

CROSS-REFERENCE TO RELATED APPLICATIONS

This application is a continuation of PCT Application No. PCT/FR02/03686, filed Oct. 25, 2002, which claims priority from French Patent Application No. 01/14683, filed Nov. 9, 2001, which are hereby incorporated herein by reference.

BACKGROUND OF THE INVENTION

The present invention relates to a gas expansion silencer of the type comprising a tubular endpiece for connection to a supply of gas under pressure flowing subsonically, and a low-pressure stage connected to the endpiece via sonic flow holes for the gas and comprising, at its end opposite from the endpiece, orifices for gas outlet at subsonic speed, said low-pressure stage being filled entirely with porous metal packing.

Such a silencer is described in document EP-A-0 404 801 and is usable as an injector or an ejector for expanding a gas, in particular in a blower device comprising a series of such silencers fed with hot air for defrosting the air inlet filters of large compressors or large gas turbines. It enables the noise that would be produced by the direct sonic expansion to the free atmosphere for a given hot air outlet section to be attenuated by about 25 decibels (dB) to 45 dB, and presents numerous advantages compared with the competing devices of the prior art, as described in above-specified document EP-A-0 404 801 to which reference can be made where necessary, and the content of which is incorporated herein by reference.

An object of the present invention is to improve that silencer, enabling its efficiency and its performance to be further improved.

SUMMARY OF THE INVENTION

To this end, the invention provides a silencer of the above-specified type for expanding a gas, comprising a tubular endpiece for connection to a supply of gas under pressure flowing subsonically, and a low-pressure stage having one end communicating with the endpiece via a series of inlet holes for gas flow at sonic speed and having an opposite end with orifices for gas outlet at subsonic speed, the low-pressure stage being filled entirely with porous metal packing, the silencer being characterized in that the low-pressure stage comprises at least two cylindrical portions of different diameters connected axially end to end and communicating with one another, the smaller-diameter portion being connected to the above-mentioned endpiece and the larger-diameter portion including the gas outlet orifices, said cylindrical portions being of axial lengths that are determined so that the end of the smaller-diameter portion which is connected to the end of the larger-diameter portion constitutes a screen between the inlet holes and the outlet orifices.

By means of this characteristic of the low-pressure stage, a mask effect or bend effect is established between the gas inlet holes and the outlet orifices, this mask or bend effect providing additional sound attenuation to the noise that results from the sonic expansion of the gas in the inlet holes.

According to another characteristic of the invention, outlet orifices are formed in a cylindrical wall of the larger-diameter portion and they are fed with a flow of gas that is substantially radial.

This increases the above-mentioned bend effect, because the gas outlet orifices are no longer directly visible from the inlet holes.

In addition, the radial flow of the gas towards the outlet orifices enables said orifices to be fed substantially uniformly, such that the gas outlet speed is substantially constant in the orifices. This avoids any excess speeds that might otherwise produce noise at the outlet from the low-pressure stage.

Advantageously, the outlet orifices which are formed in the larger-diameter cylindrical portion are distributed around a single circumference, thereby further improving the uniformity with which they are fed.

In a variant embodiment of the invention, the low-pressure stage includes at least one third cylindrical portion interconnecting the smaller-diameter portion and the larger-diameter portion and having a diameter intermediate between that of the smaller-diameter portion and said larger-diameter portion.

The invention also provides a gas blower device comprising a plurality of silencers fed by parallel strips connected to a feed manifold, the device being characterized in that the silencers are of the above-described type.

In general, the invention enables greater sound attenuation to be obtained of the noise produced by the sonic expansion of the gas, where said sound attenuation is of the order of about 35 dB to 55 dB compared with the noise that would be produced by direct sonic expansion of the gas to the free atmosphere for the same outlet section.

A further saving of about 5 dB to about 10 dB is thus obtained compared with the silencer described in above-mentioned document EP-A-0 404 801.

BRIEF DESCRIPTION OF THE DRAWING

The invention will be better understood and other characteristics, details, and advantages thereof will appear more clearly on reading the following description given by way of example with reference to the accompanying diagram in which.

DETAILED DESCRIPTION

Figure 1:
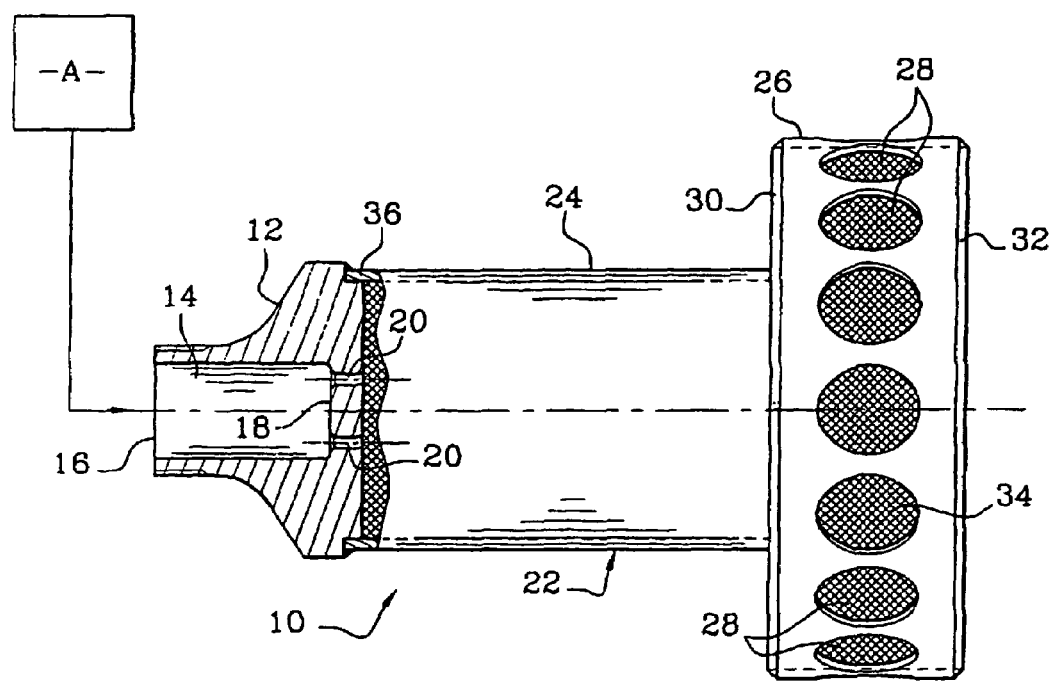
FIG. 1 is a diagrammatic fragmentary axial section view of a silencer in accordance with the invention.

The silencer 10 shown in the drawing comprises a tubular endpiece 12 made as a solid piece of stainless steel, for example, having an axial cylindrical passage 14 with an open end 16 for connection to a supply A of gas under pressure flowing subsonically, and having an opposite end that is closed by a transverse end wall 18 through which there are formed, e.g. by drilling, holes 20 that are parallel to the axis, which holes constitute gas inlet holes into a low-pressure stage 22.

The low-pressure stage 22 comprises a metal casing made up of two cylindrical portions 24 and 26 of different diameters, the smaller-diameter portion 24 being connected to the feed endpiece 12, and the larger-diameter portion 26 being connected to the smaller-diameter portion 24 and including orifices 28 for delivering the gas into the surrounding medium.

The orifices 28 are formed in a cylindrical wall of the larger-diameter portion 26, and in this case they are distributed around a single circumference. In a variant, the orifices 28 could be distributed around a plurality of circumferences, being disposed in a staggered configuration from one circumference to the next.

The two portions 24 and 26 are connected to each other in leaktight manner by a transverse wall 30 which is secured thereto by welding, for example, and they communicate via their inside spaces. The end of the larger-diameter cylindrical portion 26 facing away from the smaller-diameter portion 24 is closed in leaktight manner by a transverse end wall 32 which is secured to the cylindrical wall of the portion 24 by welding, for example.

The low-pressure stage formed by the cylindrical portions 24 and 26 is completely filled by porous metal packing 34, extending from its end connected to the endpiece 12 to the end wall 32 closing the larger-diameter portion 26.

As mentioned in the above-specified prior document, this metal packing may be an open-celled metal foam having porosity greater than 50%, or it may be a metal knit which is embossed and rolled up tight to form a cylinder, or a metal wire fabric rolled up to form a tight cylindrical roll. The porosity of the metal packing 34 preferably lies in the range approximately 85% to 95%.

The silencer of the invention is constituted by elements that are simple, inexpensive, and easy to assemble. As shown in the drawing, the smaller-diameter cylindrical portion 24 is engaged via its end on a shoulder 36 at the periphery of the end wall 18 of the endpiece 12 and is fixed to said end wall by welding, for example.

The axial and radial dimensions of the portions 24 and 26 of the low-pressure stage 22 are such that the outlet orifices 28 cannot be seen directly from the inlet holes 20, thereby creating a bend or mask effect on the flow of gas through the low-pressure stage. This bend or mask effect leads to additional reflection of the soundwaves and increases the attenuation of the noise produced by the sonic expansion of the gas in the inlet holes 20.

In addition, because of this bend effect, the outlet orifices are fed by a flow of gas that is substantially radial, and that is more uniform and homogeneous than in the above-specified prior document. This avoids any excess speed in the outlet orifices 28 and avoids the noise that such excess speed would generate.

The ratio of the sum of the sections of the outlet orifices 28 over the sum of the sections of the inlet orifices 20 lies in the range about 5 to about 500 in the silencer of the invention, thereby ensuring that the gas flows at a low subsonic speed through the outlet orifices 28.

In a variant embodiment, the low-pressure stage 22 of the silencer of the invention may comprise not merely two cylindrical portions of different diameters, but, for example, at least three cylindrical portions of staged diameters that increase between the feed endpiece 12 and the orifices for delivering gas into the surrounding medium.

The silencer of the invention is advantageously made of stainless steel and can be used with gases that are corrosive or with gases that are at high temperature (e.g. up to about 600° C.), supplied at a pressure that may be as great as about 50 bars. In the example shown in the drawing, the portion 24 has an outside diameter of about 90 millimeters (mm), the portion 26 has an outside diameter of about 170 mm, the total length is about 230 mm, and the flow rate of the gas (air, steam, etc.) may lie in the range approximately 50 grams per second (g/s) to about 300 g/s.

In a variant, and in certain applications, the portion 26 may be defined by a perforated metal sheet or by a grid. When a grid surrounds the porous metal packing 34, it is the pores in the packing that determine the outlet section of the expanded gas.

The invention claimed is:

1. A gas expansion silencer comprising a tubular endpiece having an axial cylindrical passageway with an open end for connection to a supply of gas under pressure flowing subsonically and having an opposite end closed by a transverse end wall, and a low-pressure stage having one end communicating with said opposite end of the endpiece via a series of inlet holes formed in said transverse end wall for gas flow at sonic speed and having an opposite end with orifices for gas outlet at subsonic speed, the low-pressure stage being filled entirely with porous metal packing, the low-pressure stage comprising at least two cylindrical portions of different diameters connected axially end to end and communicating with one another, the smaller-diameter portion being connected to the above-mentioned endpiece and the larger-diameter portion including a cylindrical wall in which the gas outlet orifices are formed, the gas outlet orifices being distributed around the circumference of said cylindrical wall such that the gas flows radially toward the outlet orifices, said cylindrical portions being of axial and radial dimensions that are determined so that the end of the smaller-diameter portion which is connected to the end of the larger-diameter portion constitutes a screening obstruction arranged such that said gas outlet orifices cannot be seen directly from said gas inlet holes, thereby creating a bend effect on the flow of gas through the low pressure stage, preventing a direct flow path for gas between the inlet holes and the outlet orifices.

2. A silencer according to claim 1, wherein the low-pressure stage includes at least one third cylindrical portion interconnecting the smaller-diameter portion larger-diameter portion and having a diameter intermediate between that of the smaller-diameter portion and the larger-diameter portion.

3. A silencer according to claim 1, wherein the ratio of the sum of the sections of the outlet orifices over the sum of the sections of the inlet holes lies in the range approximately 5 to approximately 500.

4. A silencer according to claim 1, wherein the metal packing has porosity of about 85% to about 95%.

5. A silencer according to claim 1, wherein the above-mentioned endpiece is formed as a single piece and has a cylindrical passage with one end that is open for connection to the supply of gas under pressure and whose opposite end is closed by a transverse end wall through which the inlet holes are formed.

6. A silencer according to claim 5, wherein the smaller-diameter portion of the low-pressure stage has its cylindrical end engaged on a shoulder of said end wall of the endpiece and is fastened to said shoulder by welding, for example.

7. A silencer according to claim 1, wherein the larger-diameter portion is defined by a perforated metal sheet or by a grid.

8. A gas blower device comprising a plurality of silencers fed by parallel strips connected to a feed manifold, wherein each of the silencers comprises a tubular endpiece having an axial cylindrical passageway with an open end for connection to a supply of gas under pressure flowing subsonically and having an opposite end closed by a transverse end wall, and a low-pressure stage having one end communicating with said opposite end of the endpiece via a series of inlet holes formed in said transverse end wall for gas flow at sonic speed and having an opposite end with orifices for gas outlet at subsonic speed, the low-pressure stage being filled entirely with porous metal packing, the low-pressure stage comprising at least two cylindrical portions of different diameters connected axially end to end and communicating with one another, the smaller-diameter portion being connected to the above-mentioned endpiece and the larger-diameter portion including a cylindrical wall in which the gas outlet orifices are formed, the gas outlet orifices being distributed around the circumference of said cylindrical wall such that the gas flows radially toward the outlet orifices, said cylindrical portions being of axial and radial dimensions that are determined so that the end of the smaller-diameter portion which is connected to the end of the larger-diameter portion constitutes a screening obstruction arranged such that said gas outlet orifices cannot be seen directly from said gas inlet holes, thereby creating a bend effect on the flow of gas through the low pressure stage, preventing a direct flow path for gas between the inlet holes and the outlet orifices.

* * * * *